(12) United States Patent
Hawkins et al.

(10) Patent No.: US 8,968,685 B2
(45) Date of Patent: Mar. 3, 2015

(54) FUEL PROCESSING SYSTEM AND RELATED METHODS

(75) Inventors: Sabrina Hawkins, New York, NY (US); Jason S. Tyll, East Northport, NY (US); Florin Girlea, Flushing, NY (US)

(73) Assignee: Alliant TechSystems Inc., Arlington, VA (US)

( * ) Notice: Subject to any disclaimer, the term of this patent is extended or adjusted under 35 U.S.C. 154(b) by 294 days.

(21) Appl. No.: 13/094,709

(22) Filed: Apr. 26, 2011

(65) Prior Publication Data

US 2012/0272567 A1   Nov. 1, 2012

(51) Int. Cl.
| | |
|---|---|
| *B01J 8/00* | (2006.01) |
| *C10K 3/04* | (2006.01) |
| *B01J 19/00* | (2006.01) |
| *B01J 19/24* | (2006.01) |
| *C10K 1/00* | (2006.01) |
| *C10L 1/00* | (2006.01) |
| *C10L 1/02* | (2006.01) |
| *C10L 3/00* | (2006.01) |
| *C10L 3/06* | (2006.01) |
| *C10L 3/08* | (2006.01) |
| *C10L 3/10* | (2006.01) |

(52) U.S. Cl.
CPC . *C10K 1/004* (2013.01); *C10K 3/04* (2013.01); *B01J 2219/00006* (2013.01)
USPC ........... 422/630; 422/129; 422/187; 422/600; 422/625; 422/626; 422/628; 422/631; 518/702; 518/703

(58) Field of Classification Search
CPC ......... A01N 59/00; A01N 37/16; B01J 19/00; B01J 8/00; C07C 15/08; C07C 11/04; C07C 29/1518; C07C 31/04; C01B 2203/062; C01B 2203/0233; Y02E 50/32
USPC ......... 422/129, 600, 625, 626, 628, 630, 631; 518/702, 703

See application file for complete search history.

(56) References Cited

U.S. PATENT DOCUMENTS

| | | | | |
|---|---|---|---|---|
| 2,928,460 | A | * | 3/1960 | Eastman et al. ............... 122/6.5 |
| 3,434,937 | A | * | 3/1969 | Akin et al. ...................... 203/79 |
| 3,920,717 | A | * | 11/1975 | Marion .......................... 518/703 |
| 3,959,972 | A | * | 6/1976 | Rudolph et al. ................ 60/651 |
| 4,134,732 | A | * | 1/1979 | Jackson ........................ 422/198 |

(Continued)

OTHER PUBLICATIONS

Al-Hamamre, Z., et al., Hydrogen Production by Thermal Partial Oxidation of Hydrocarbon Fuels in Porous Media Based Reformer, International Journal of Hydrogen Energy, 2009, pp. 827-832, vol. 34.

(Continued)

*Primary Examiner* — Natasha Young
(74) *Attorney, Agent, or Firm* — TraskBritt

(57) ABSTRACT

A fuel processing system for converting a logistical fuel and air into a liquid product comprising methanol. One such system comprises a fuel injection system configured to combine a logistical fuel and ambient air to produce a logistical fuel and air mixture, a synthesis gas production system configured to convert the logistical fuel and air mixture to synthesis gas, and a methanol synthesis system configured to convert the synthesis gas to a crude methanol liquid. Related methods are additionally disclosed.

29 Claims, 9 Drawing Sheets

(56) References Cited

U.S. PATENT DOCUMENTS

| | | | |
|---|---|---|---|
| 4,476,249 A * | 10/1984 | Avery | 518/703 |
| 4,522,894 A * | 6/1985 | Hwang et al. | 429/425 |
| 4,592,762 A * | 6/1986 | Babu et al. | 48/197 R |
| 4,927,857 A * | 5/1990 | McShea et al. | 518/703 |
| 5,770,630 A * | 6/1998 | Kowal et al. | 518/706 |
| 5,773,162 A * | 6/1998 | Surampudi et al. | 429/514 |
| 6,156,084 A | 12/2000 | Bonville, Jr. et al. | |
| 6,669,744 B2 * | 12/2003 | Allam et al. | 48/127.9 |
| 6,894,080 B2 | 5/2005 | Seiki et al. | |
| 6,921,733 B2 | 7/2005 | Mahajan | |
| 7,019,039 B1 * | 3/2006 | Fraley | 518/700 |
| 7,189,379 B2 | 3/2007 | Kobayashi et al. | |
| 7,262,334 B2 | 8/2007 | Schmidt et al. | |
| 7,435,760 B2 | 10/2008 | Herling et al. | |
| 7,772,292 B2 | 8/2010 | Jenkins et al. | |
| 2007/0043126 A1 | 2/2007 | Lattner | |
| 2010/0175386 A1 * | 7/2010 | Haynes | 60/780 |
| 2011/0038762 A1 | 2/2011 | Girlea et al. | |

OTHER PUBLICATIONS

Karanjikar, Mukund, et al., Logistic Fuel to Hydrogen—Fuel Processing Using Microfibrous Entrapped Catalysts and Sorbents for Pem Fuel Cell, Prepr. Pap.-Am. Chem. Soc., Div. Fuel Chem., 2004, pp. 910-911, vol. 49, No. 2.

Mendes, Miguel, A.A., et al., Parametric Uncertainty Quantification in Modeling Methane Thermal Partial Oxidation Within Inert Porous Media, V European Conference on Computational Fluid Dynamics, ECCOMAS CFD 2010, Lisbon Portugal, Jun. 14-17, 2010, 18 pages.

Rostrup-Nielsen, Jens R., Syngas in Perspective, Catalysis Today, 2002, pp. 243-247, vol. 71.

Roth, Kolja, et al., Investigation of Soot Formation During Partial Oxidation of Diesel Fuel, Chem. Eng. Technol., 2007, pp. 782-789, vol. 30, No. 6.

Yasuda, K., et al., The Effects of Contaminants of Fuel on the Direct Methanol Fuel Cell (DMFC) Performance, ECS Transactions, 2007, pp. 291-296, vol. 5, No. 1, The Electrochemcial Society.

* cited by examiner

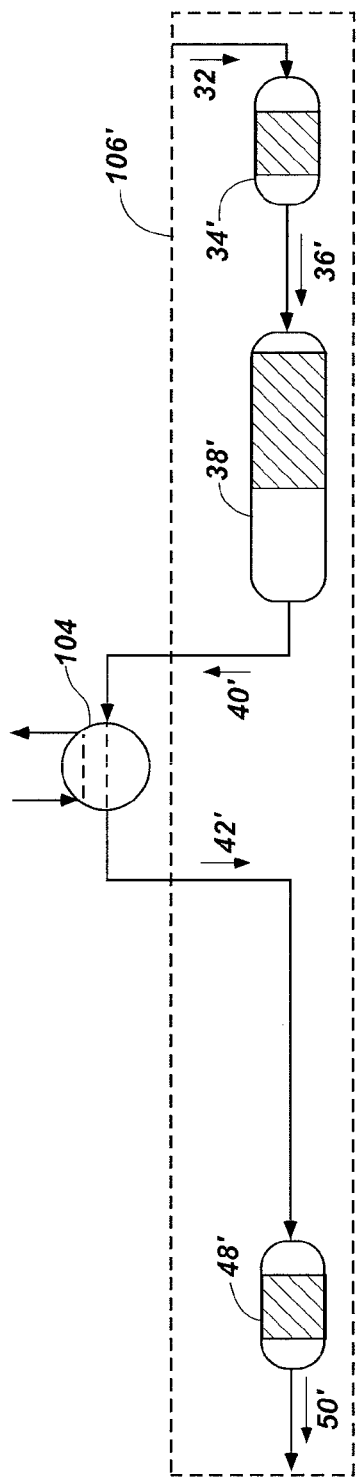
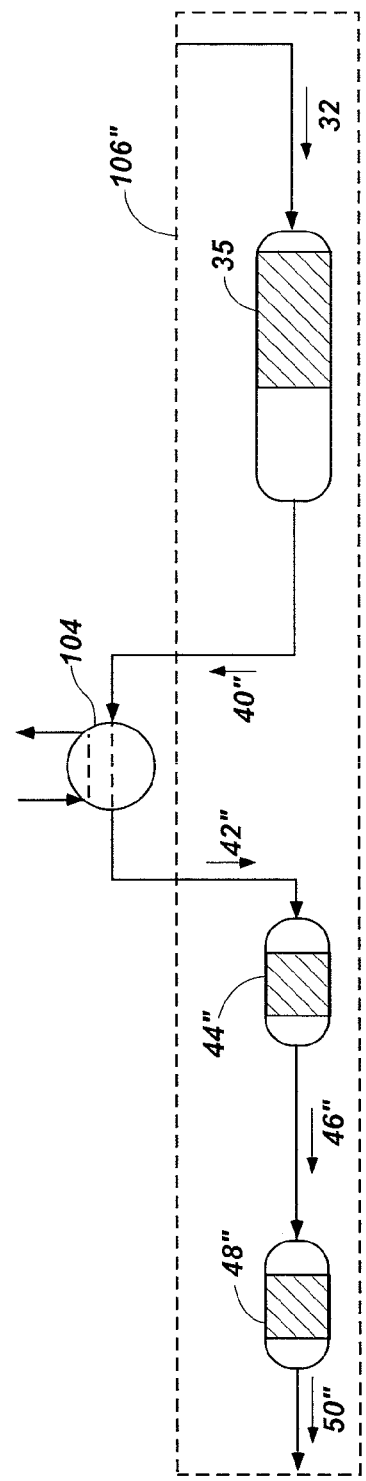

FUEL PROCESSING SYSTEM AND RELATED METHODS

TECHNICAL FIELD

The present disclosure relates to a system and a method of producing methanol. More specifically, embodiments of the present disclosure relate to a system and a method of converting a mixture of air and logistical fuel into a liquid product comprising methanol.

BACKGROUND

Methanol, the simplest alcohol, is a commodity chemical that is used in a wide range of applications. For example, methanol may be used in the production of other chemicals (e.g., formaldehyde, gasoline, dimethyl ether), as a biological food source for bacteria (e.g., to support sewage treatment facilities), and as a fuel source for a direct methanol fuel cell (DMFC).

The production of substantially pure methanol has been known since 1661 when Robert Boyle produced it through the distillation of boxwood. Since that time, the production of methanol has expanded, and today methanol is generally produced on a very large scale. Conventional methanol production facilities can produce 1000 metric tons of methanol per day. For example, a methanol production facility in Al Jubail, Saudi Arabia, has been reported to produce approximately 850,000 tons per year of methanol. Such production of methanol is typically facilitated through the catalyst-assisted steam reformation of natural gas or coal to form synthesis gas. The synthesis gas is then reacted over a catalyst at high pressure at conversions typically less than 20%. Large facilities require recycle loops. However, preparing methanol using conventional production methods at small scales is not commercially feasible. The produced methanol may then be conventionally distributed as demand requires.

However, in certain, specialized situations the use of conventional methanol production processes may not be a viable option. Such situations may, for example, include scenarios where the transport or delivery of methanol is in some way precluded and/or where the on-site production of methanol through conventional fuels (e.g., natural gas, coal) is not possible. A non-limiting example of such a situation may be current U.S. military operations.

In 1988, the U.S. Army adopted a so-called "single fuel forward" initiative generally mandating the use of only one fuel in its operations. That fuel is currently a kerosene-based fuel known as Jet Propellant 8 (JP-8). Disadvantageously, the initiative is not readily compatible with some methanol-based technologies that may be of interest to the U.S. military, including DMFCs. DMFCs, which attempt to harness the theoretical 6100 W h/kg at 25° C. energy density of methanol, have been examined as a potential replacement for the numerous batteries (rechargeable and non-rechargeable) currently used in U.S. military operations. A methanol-containing DMFC cartridge typically offers more stored power than a battery, and using DMFCs may reduce various logistical and transportation concerns currently associated with the use of batteries.

Therefore, in at least some specialized situations, there remains a need for a portable fuel processing system that uses a logistical fuel, such as JP-8, to manufacture methanol products. Such a system may bridge the gap between the methanol that may be required and the logistical fuel that may be available.

BRIEF SUMMARY

Embodiments described herein include systems for producing methanol from a logistical fuel, and related methods. For example, in accordance with one embodiment described herein, a fuel processing system may comprise a fuel injection system configured to combine a logistical fuel and ambient air to produce a logistical fuel and air mixture, a synthesis gas production system positioned downstream of the fuel injection system and configured to convert the logistical fuel and air mixture to synthesis gas, and a methanol synthesis system positioned downstream of the synthesis gas production system and configured to convert the synthesis gas to a crude methanol liquid.

In additional embodiments, a method of manufacturing a liquid product comprising methanol may comprise combining a logistical fuel and ambient air to produce a logistical fuel and air mixture, converting the logistical fuel and air mixture into synthesis gas comprising carbon monoxide and hydrogen, converting the synthesis gas to a crude methanol liquid, processing the crude methanol liquid to produce a purified methanol liquid, and directing at least the purified methanol liquid into a dispensing valve to generate the liquid product comprising methanol and water.

In yet additional embodiments, a method of manufacturing a fuel for use in a direct methanol fuel cell may comprise processing a logistical fuel and ambient air to produce a purified methanol liquid, combining the purified methanol liquid with water to produce a liquid product, and delivering the liquid product into at least one empty direct methanol fuel cell cartridge.

BRIEF DESCRIPTION OF THE SEVERAL VIEWS OF THE DRAWINGS

While the specification concludes with claims particularly pointing out and distinctly claiming that which is regarded as the invention, advantages of the invention can be more readily ascertained from the following detailed description when read in conjunction with the accompanying drawings in which:

FIG. 3 is a schematic view of an embodiment of a synthesis gas production system portion of the fuel processing system of FIG. 1.

FIG. 4 is a schematic view of an embodiment of a synthesis gas production system portion of the fuel processing system of FIG. 1.

DETAILED DESCRIPTION

The following description provides specific details, such as catalyst types, fuel compositions, and processing conditions (e.g., temperatures, pressures, flow rates, etc.) in order to provide a thorough description of embodiments of the present disclosure. However, a person of ordinary skill in the art will understand that the embodiments of the present disclosure may be practiced without employing these specific details. Indeed, the embodiments of the present disclosure may be practiced in conjunction with conventional systems and methods employed in the industry. In addition, only those process components and acts necessary to understand the embodiments of the present disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the present disclosure. The drawings accompanying the present application are for illustrative purposes only, and are not meant to be actual views of any particular material, device, or system. Additionally, elements common between figures may retain the same numerical designation.

Methods and systems of producing methanol from a logistical fuel are described. The logistical fuel is reformed to synthesis gas, which is converted to methanol. The systems and methods of embodiments of the present disclosure may be used to produce methanol at a small-scale, such as about 0.1 metric ton per day, rather than producing large amounts of methanol as is done by conventional systems and methods. The methanol produced by the methods and systems of embodiments of the present disclosure may be produced at the point-of-use, rather than at a remote facility.

Figure 1:
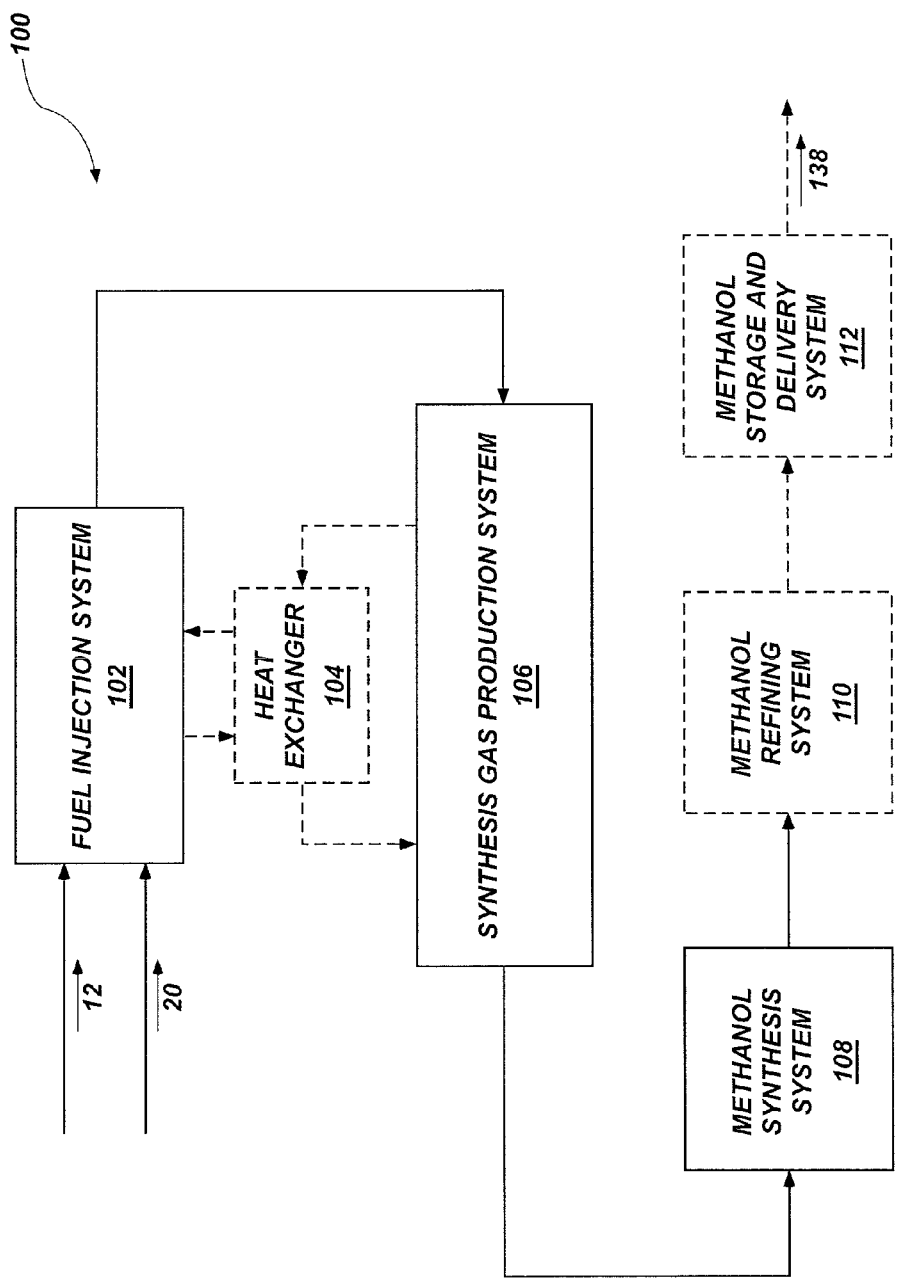
FIG. 1 is a simplified block flow diagram of a fuel processing system for converting a logistical fuel and air into a methanol product, in accordance with embodiments of the present disclosure.

FIG. 1 is a simplified block diagram of a fuel processing system 100 in accordance with the present disclosure. The fuel processing system 100 functions to convert ambient air 20 and a logistical fuel (i.e., a liquid logistical fuel stream 12) into a liquid product 138 that includes methanol. The fuel processing system 100 may include a fuel injection system 102, optionally, a heat exchanger 104, a synthesis gas production system 106, a methanol synthesis system 108, optionally, a methanol refining system 110, and, optionally, a methanol storage and delivery system 112. The fuel processing system 100 may be sized and configured to produce a desired output of the liquid product 138, such as within the range of from about 1.0 L/hr to about 50.0 L/hr, or from about 7.5 L/hr to about 14.5 L/hr. The logistical fuel may include at least one of JP-8, Jet-A, JP-4, JP-5, kerosene, naphtha, diesel, marine, gasoline, and other hydrocarbon fuels. In one embodiment, the logistical fuel is JP-8. JP-8 is a kerosene-based jet fuel and includes icing inhibitors, corrosion inhibitors, antioxidants, lubricants, biocides, thermal stability agents, and antistatic agents. The kerosene includes $C_9$-$C_{16}$ hydrocarbon compounds, such as a mixture of isooctane, methylcyclohexane, m-xylene, cyclooctane, decane, butylbenzene, 1,2,4,5-tetramethylbenzene, tetralin, dodecane, 1-methylnaphthalene, tetradecane, and hexadecane. In at least some embodiments, the fuel processing system 100 may be configured and operated to convert other fuels, such as natural gas, into the liquid product 138.

Figure 2:
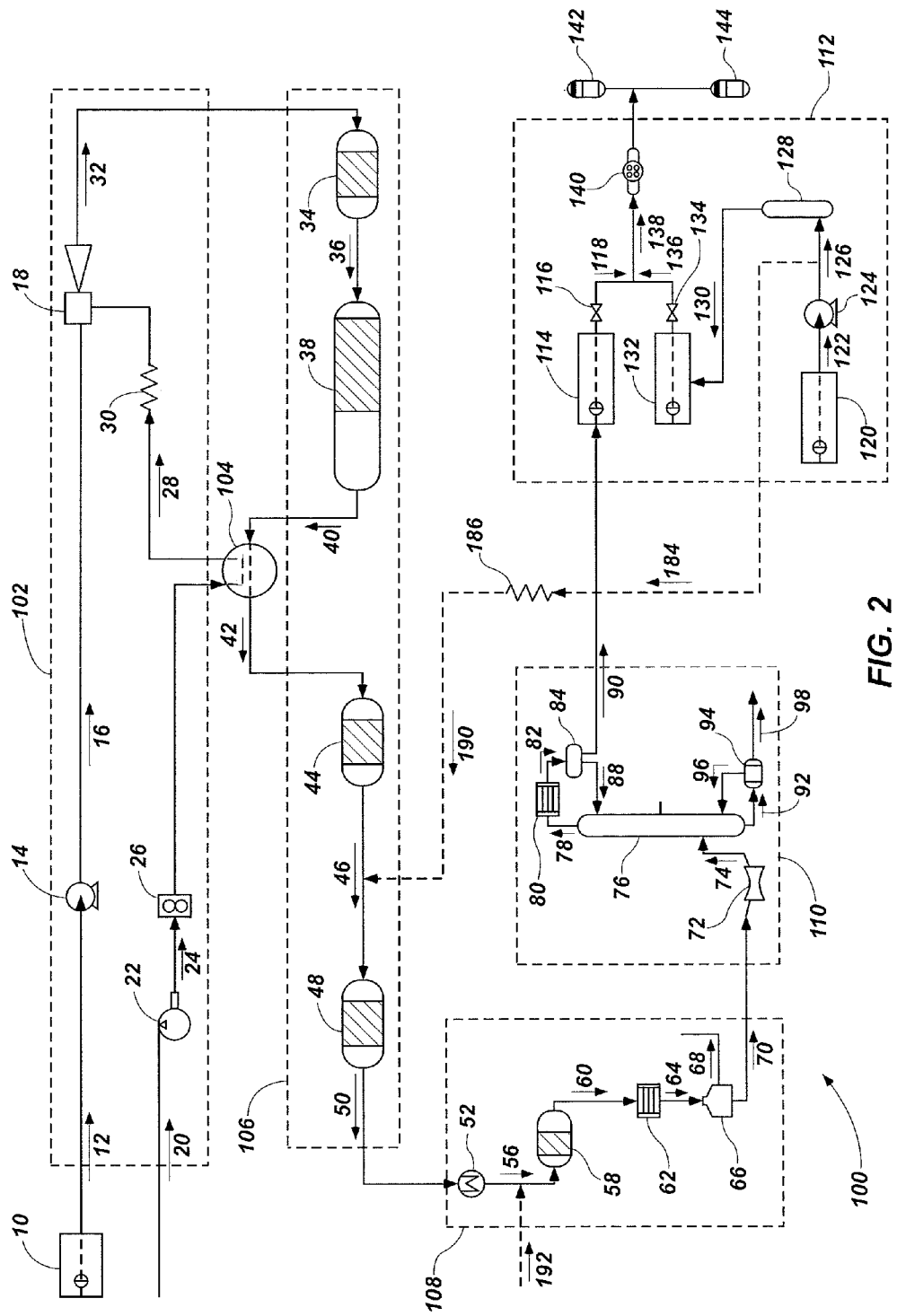
FIG. 2 is a schematic view of the fuel processing system of FIG. 1, in accordance with an embodiment of the present disclosure.

One embodiment of the present disclosure will now be described with reference to FIG. 2, which schematically illustrates a fuel processing system 100. As shown in FIG. 2, the fuel injection system 102 may include a fuel pump 14, an air compressor 22, a mass flow controller 26, an air heater 30, and a fuel injector 18. The fuel pump 14 receives a logistical fuel stream 12 from a storage vessel 10 and raises the pressure of the logistical fuel. The logistical fuel stream 12 may be in a liquid form. A pressurized liquid logistical fuel stream 16 is then directed out of the fuel pump 14 and into the fuel injector 18. In at least some embodiments, a fuel pressure regulator (not shown) may be provided downstream of the fuel pump 14 to further control the pressure of the pressurized liquid logistical fuel stream 16. The air compressor 22 may receive ambient air 20 and may raise the pressure of the ambient air 20 to be within an operative pressure range of the mass flow controller 26. Pressurized air 24 may then be directed out of the air compressor 22 and into the mass flow controller 26. The mass flow controller 26 may control the flow rate of the pressurized air 24 in a manner that accords with a desired mixture ratio of logistical fuel to air to be achieved via the fuel injector 18. The pressurized air 24 may then be directed into the heat exchanger 104. In the heat exchanger 104 the pressurized air 24 may be heated. Heated and pressurized air 28 may then be directed out of the heat exchanger 104 and into the air heater 30. The air heater 30 may increase the temperature of the heated and pressurized air 28 to a pre-determined set-point. In one or more embodiments, at least one of the heat exchanger 104 and the air heater 30 may be omitted. Therefore, the heat exchanger 104 and the air heater 30 may each be optional. In at least some embodiments, the temperature of the heated and pressurized air 28 may be greater than or equal to about 160° C., such as greater than or equal to about 300° C., or greater than or equal to about 350° C. The heated and pressurized air 28 may then be directed out of the air heater 30 and into the fuel injector 18.

The fuel injector 18 may facilitate the mixing of the pressurized liquid logistical fuel stream 16 and the heated and pressurized air 28. After receiving the pressurized logistical fuel stream 16 and the heated and pressurized air 28, the fuel injector 18 may be "opened," to force the logistical fuel and air through an atomizing nozzle. This process may create a logistical fuel/air mixture 32 that includes small droplets of liquid logistical fuel dispersed in air. The logistical fuel/air mixture 32 may have an oxygen to carbon ratio of between about 0.4 and about 1.25. In at least some embodiments, the temperature of the logistical fuel/air mixture 32 may be greater than or equal to about 160° C., such as greater than or equal to about 300° C., or greater than or equal to about 350° C. The flow rate and flow regularity of the logistical fuel/air mixture 32 may be modified as desired by adjusting the pressure of the pressurized liquid logistical fuel stream 16, the amount of time that the fuel injector 18 remains open, and the frequency with which the fuel injector 18 is opened. The logistical fuel/air mixture 32 may be directed to the synthesis gas production system 106.

The synthesis gas production system 106 may include desulfurization units 34 and 44, a catalytic partial oxidation (CPDX) reactor 38, and, optionally, a water gas shift (WGS) reactor 48. The logistical fuel/air mixture 32 may be received by the desulfurization unit 34. The desulfurization unit 34 may be any suitable apparatus or device known in the art for reducing the sulfur content of a hydrocarbon, such as the logistical fuel. The desulfurization unit 34 may reduce the sulfur content of the logistical fuel/air mixture 32 to a level that substantially reduces or eliminates catalyst poisoning within the CPDX reactor 38. In at least some embodiments, the desulfurization unit 34 may facilitate a reaction with the logistical fuel/air mixture 32 to produce a desulfurized logistical fuel/air mixture 36 including less than about 50 ppm sulfur. The desulfurized logistical fuel/air mixture 36 may then be directed into the CPDX reactor 38. In at least some embodiments, the temperature of the desulfurized logistical fuel/air mixture 36 may be within a range of from about 175° C. to about 450° C., such as from about 300° C. to about 425° C., or from about 350° C. to about 400° C. In at least some embodiments, the sulfur content of the logistical fuel and/or the configuration of the CPDX reactor 38 may enable the desulfurization unit 34 to be omitted from the synthesis gas production system 106, and the logistical fuel/air mixture 32 may be directed into the CPDX reactor 38. Therefore, the desulfurization unit 34 may be optional.

Optionally, to increase the percentage of $O_2$ in the desulfurized logistical fuel/air mixture 36, a suitable oxygen concentrator, such as at least one of a pressure swing adsorption (PSA) system (not shown) and a molecular sieve (not shown), may be provided upstream of the CPDX reactor 38.

The CPDX reactor 38 may be any suitable apparatus or device known in the art for the catalytic partial oxidation of a hydrocarbon. The CPDX reactor 38 may be configured and operated to reform the desulfurized logistical fuel/air mixture 36 into a synthesis gas according to the following general equation, where, for a given hydrocarbon, "n" corresponds to an integer within the range of from 1 to 50 and "m" corresponds to an integer within the range of from 1 to 100:

$$C_nH_m + \frac{n}{2}O_2 \rightarrow nCO + \frac{m}{2}H_2 \qquad (1)$$

The catalytic partial oxidation may be conducted over a catalyst including at least one of Fe, Ru, Os, Co, Rh, Ir, Ni, Pd, Pt, Cu, Ag, and Au. In one embodiment, the catalyst includes at least one of Rh and Pt. The CPDX reactor 38 may have an operating temperature within a range of from about 600° C. to about 1600° C., such from about 800° C. to about 1250° C., or from about 900° C. to about 1100° C. The synthesis gas may include additional components, such as $N_2$, $CO_2$, $H_2O$ and trace amounts of small hydrocarbons. A synthesis gas 40 may exit the CPDX reactor 38 and may then be directed into the heat exchanger 104.

The heat exchanger 104 may be any suitable apparatus or device known in the art for exchanging heat from one fluid or gas to another fluid or gas. By way of non-limiting example, the heat exchanger 104 may be a recuperative heat exchanger, which functions to cool the synthesis gas 40 while heating the pressurized air 24. In one or more embodiments, the heat exchanger 104 may cool the synthesis gas 40 from a temperature within a range of from about 600° C. to about 1600° C. to a temperature within a range of from about 200° C. to about 350° C., such as from about 250° C. to about 340° C. In at least some embodiments, one or more flow control devices (not shown) may be positioned proximate at least one of an inlet and an outlet of the heat exchanger 104 to control the flow rate of at least one of the synthesis gas 40 and the pressurized air 24 and regulate the heat exchange rates thereof. Upon exiting the heat exchanger 104, a cooled synthesis gas 42 may be directed into the desulfurization unit 44. In at least some embodiments, the heat exchanger 104 may be omitted, and the synthesis gas 40 may be cooled by some other known device or apparatus, or not at all. Therefore, the heat exchanger 104 may be optional.

The desulfurization unit 44 may be any suitable apparatus or device known in the art for reducing the sulfur content of a gas. The desulfurization unit 44 may be similar to or different than the desulfurization unit 34. The desulfurization unit 44 may substantially reduce the sulfur content of the cooled synthesis gas 42. A desulfurized synthesis gas 46 may exit the desulfurization unit 44 and may then be directed into the WGS reactor 48, if present. The temperature of the desulfurized synthesis gas 46 may be within the range of from about 200° C. to about 350° C., such as from about 300° C. to about 350° C.

The WGS reactor 48 may be any suitable apparatus or device known in the art for reacting $CO_2$ and $H_2$ to produce CO and $H_2O$. The WGS reactor 48 may be configured and operated to process the desulfurized synthesis gas 46 according to the following equation:

$$H_2 + CO_2 \leftrightarrow CO + H_2O \qquad (2)$$

The operating temperature of the WGS reactor 48 may be within a range of from about 200° C. to about 400° C., such as from about 300° C. to about 375° C. or from about 325° C. to about 350° C. A treated synthesis gas 50 that may exit the WGS reactor 48 may have a molar ratio of $H_2$ to CO in the range of from about 1.0 to about 3.0, such as from about 1.5 to about 2.5, or about 2.0. In one or more embodiments, the WGS reactor 48 may be omitted, in which case desulfurized synthesis gas 46 is directed into the methanol synthesis system 108. The treated synthesis gas 50 may exit the WGS reactor 48 and may then be directed into the methanol synthesis system 108.

Optionally, steam 190 may be added to the synthesis gas production system 106 at a location upstream of the WGS reactor 48. Adding the steam 190 functions to increase the molar ratio of $H_2$ to CO in the treated synthesis gas 50. As shown in FIG. 2, a water stream 122 from a second storage vessel 120 may be delivered to a pump 124, which may pressurize the water stream 122. A pressurized water stream 126 may exit the pump 124 and may be at least partially directed, as a second pressurized water stream 184, to a water heater 186. The water heater 186 may increase the temperature of the second pressurized water stream 184 to generate the steam 190. The steam 190 may have a temperature that is compatible with a desired molar ratio of $H_2$ to CO in the treated synthesis gas 50. The steam 190 may exit the water heater 186 and may then be combined with the desulfurized synthesis gas 46.

To decrease the concentration of at least one of $H_2O$ and $CO_2$ in the treated synthesis gas 50, various conventional means, such as at least one of a PSA system (not shown) and a molecular sieve (not shown) may, optionally, be provided upstream of the methanol synthesis system 108.

In additional embodiments, the synthesis gas production system 106 may be configured and operated as depicted in FIG. 3, in which the desulfurization unit 44 may be omitted from the synthesis gas production system 106'. The desulfurization unit 34' may reduce the sulfur content within the logistical fuel/air mixture 32 to a sufficient extent that the desulfurization unit 44 may be omitted. After passing through the CPDX reactor 38' and the heat exchanger 104, the cooled synthesis gas 42' may be directed into the WGS reactor 48'.

In further embodiments, the synthesis gas production system 106 may be configured and operated as depicted in FIG. 4. As shown in FIG. 4, the synthesis gas production system 106" may include a thermal partial oxidation (TPDX) reactor 35 in place of the CPDX reactor 38, and desulfurization unit 34 may not be included. The TPDX reactor 35 may be any suitable apparatus or device known in the art for the production of a synthesis gas from the catalyst-free partial oxidation of a hydrocarbon. The logistical fuel and air mixture 32 may be delivered into the TPDX reactor 35 without prior desulfurization at least because the TPDX reactor 35 does not include a catalyst, which can be poisoned by any sulfur content of the logistical fuel/air mixture 32. However, in at least some embodiments, a desulfurization unit (not shown, refer to the desulfurization unit 34 depicted in FIG. 2) may be provided upstream of TPDX reactor 35. The TPDX reactor 35 may have an operating temperature within a range of from about 800° C. to about 1600° C., such as from about 1000° C. to about 1600° C. or from about 1200° C. to about 1600° C. Residence time within the TPDX reactor 35 may be within the range of from about $1 \times 10^{-4}$ s to about $1 \times 10^{4}$ s, more particularly from about $1 \times 10^{-3}$ s to about 1000 s, and even more particularly from about 0.01 s to about 500 s. In at least some embodiments, the synthesis gas 40'' may be passed through a particulate separation unit (not shown) such as a high temperature (e.g., ceramic) filter or cyclone separator to substantially reduce any soot levels in the synthesis gas 40'' prior to further processing.

Figure 5:
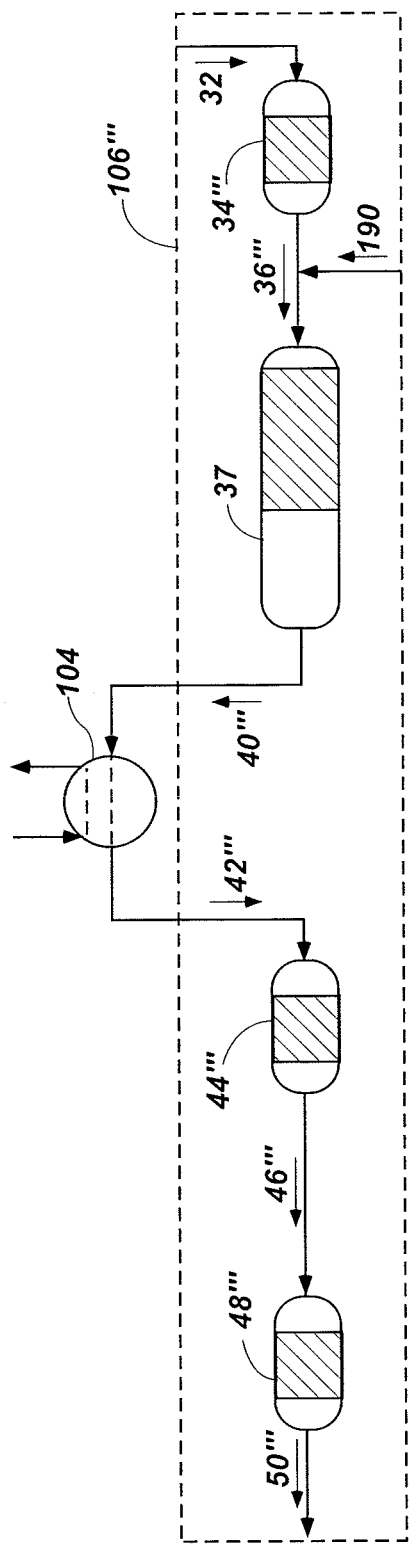
FIG. 5 is a schematic view of an embodiment of a synthesis gas production system portion of the fuel processing system of FIG. 1.

In yet further embodiments, the synthesis gas production system 106 may be configured and operated as depicted in FIG. 5. As shown in FIG. 5, the synthesis gas production system 106''' may include an autothermal reactor (ATR) 37 in place of the CPDX reactor 38. Steam 190 may be added to the desulfurized logistical fuel/air mixture 36''', which may then be directed into the ATR 37. In at least some embodiments, the ATR 37 may receive the desulfurized logistical fuel/air mixture 36''' and the steam 190 separately. The ATR 37 may be any suitable apparatus or device known in the art for the production of a synthesis gas via the catalytic partial oxidation and steam reformation of a hydrocarbon. The ATR 37 may be configured and operated to reform the desulfurized logistical fuel/air mixture 36''' into a synthesis gas according to general equation (1) and the following general equations, where, for a given hydrocarbon, "n" corresponds to an integer within the range of from 1 to 50 and "m" corresponds to an integer within the range of from 1 to 100:

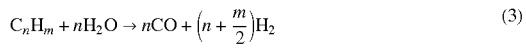  (3)

$$CH_4 + H_2O \leftrightarrow CO + 3H_2$$  (4)

In at least some embodiments, the ATR 37 may be an apparatus such as that disclosed in U.S. Patent Application Publication No. 2011/0038762, which describes an ATR including a housing, a first plate having a first plurality of fin structures, and a second plate having a second plurality of fin structures assembled such that the first plurality of fin structures is interleaved with the second plurality of fin structures. The fin structures may be coated with a suitable catalyst material, which may include Pt, Pd, and alloys thereof. The synthesis gas 40''' exiting the ATR 37 may have a temperature of less than or equal to 400° C., such as less than or equal to 350° C., or less than or equal to 310° C. The disclosure of U.S. Patent Application Publication No. 2011/0038762 is incorporated by reference herein in its entirety.

Returning to FIG. 2, the methanol synthesis system 108 may include a heat exchanger 52, a methanol synthesis reactor 58, a condensing unit 62, and a liquid collection unit 66. The treated synthesis gas 50 may be received by the heat exchanger 52. The heat exchanger 52 may be any suitable apparatus or device known in the art for cooling a gas flow, such as an air blast heat exchanger. The heat exchanger 52 may decrease the temperature of the treated synthesis gas 50 to a temperature suitable for the synthesis of crude methanol in the methanol synthesis reactor 58. A cooled and treated synthesis gas 56 may exit the heat exchanger 52 and may then be directed into the methanol synthesis reactor 58.

The methanol synthesis reactor 58 may be any suitable apparatus or device known in the art for producing methanol from the catalyst-assisted reaction of synthesis gas components according to the following equations:

  (5)

  (6)

The methanol synthesis may be typically be conducted using a catalyst including at least one oxide of Cu, Zn, Mg, Al, Cr, Ag, Mo, W, Ti, Zr, Hf, B, Mn, V, Ga, Pd, Os, or combinations thereof, such as at least one of at least one of CuO, ZnO, $Al_2O_3$, and $Cr_2O_3$. In at least some embodiments, the methanol synthesis reactor 58 may include at least one catalyst such as disclosed in U.S. Pat. No. 6,921,733, which discloses a liquid phase catalyst prepared from the reaction of a transition metal having coordinating ligands and an alkoxide dissolved in either methanol or methanol and a co-solvent. The transition metal is a metal from Group 6, Group 8, Group 9, Group 10, Group 11, Group 12, or mixtures thereof, such as Mo, W, Fe, Ru, Os, Co, Rh, Ir, Ni, Pd, Pt, Cu, Au, Zn, Cd, or mixtures thereof. The coordinating ligands may include N-donor ligands, P-donor ligands, O-donor ligands, C-donor ligands, halogens, or mixtures thereof, such as chloride, acetylacetonate, 2,2'-dipyridyl (Bipy), bis(cyclooctadiene), 1,10-phenanthroline, 1,2-bis(diphenylphosphinethane), or mixtures thereof. Co-solvents may include saturated hydrocarbons, amine based solvents, ethers, esters, alkyl polyethers, hydroxyalkylpolyethers, and alcohols. Use of such a catalyst may enable conversion rates of from about 80% to about 90% with non-ideal stoichiometry ratios.

The operating temperature of the methanol synthesis reactor 58 may be within a range of from about 20° C. to about 350° C., such as from about 100° C. to about 280° C. In at least some embodiments, the operating temperature of the methanol synthesis reactor 58 may be within the range of from about 100° C. to about 150° C. The operating pressure of the methanol synthesis reactor 58 may be within a range of from about 3 atm to about 250 atm, such as from about 7 atm to about 150 atm, or from about 7 atm to about 80 atm. In one or more embodiments, the operating pressure of the methanol synthesis reactor 58 may be within the range of from about 4 atm to about 11 atm. The gas hourly space velocity (GHSV) through the catalyst may be adjusted to achieve a desired conversion efficiency. The methanol synthesis reactor 58 may have a single pass conversion efficiency of greater than about 10%, such as greater than about 40%, or greater than about 75%. In at least some embodiments, the methanol synthesis reactor 58 may have a single pass conversion efficiency within the range of from about 90% to about 99%.

A crude methanol stream 60, which may include at least one of liquid methanol and gaseous methanol, along with one or more reaction byproducts, unreacted components, and catalyst, may exit the methanol synthesis reactor 58 and may then be directed to the condensing unit 62. The condensing unit 62 may include any device or apparatus known in the art (e.g., an electric precipitator) that may be configured and operated to cool the crude methanol gas 60 and liquefy the methanol therein. In at least some embodiments, the condensing unit 62 may be configured and operated to liquefy any gaseous methanol and any gaseous components with a boiling point higher than methanol (e.g., $H_2O$, ethanol, if present)

while components with lower boiling points (e.g., methyl formate, dimethyl ether, if present) may remain in a gaseous state. A cooled crude methanol stream 64 may exit the condensing unit 62 and may then be directed to a liquid collection unit 66. The liquid collection unit 66 may collect any liquid components of the cooled crude methanol stream 64 and may vent any gaseous components as offgas 68. The liquid components may exit the liquid collection unit 66 as a crude methanol liquid 70 and may then be directed into the methanol refining system 110. In at least some embodiments, the crude methanol liquid 70 may be substantially pure methanol, such as greater than or equal to about 95% methanol.

Figure 6:
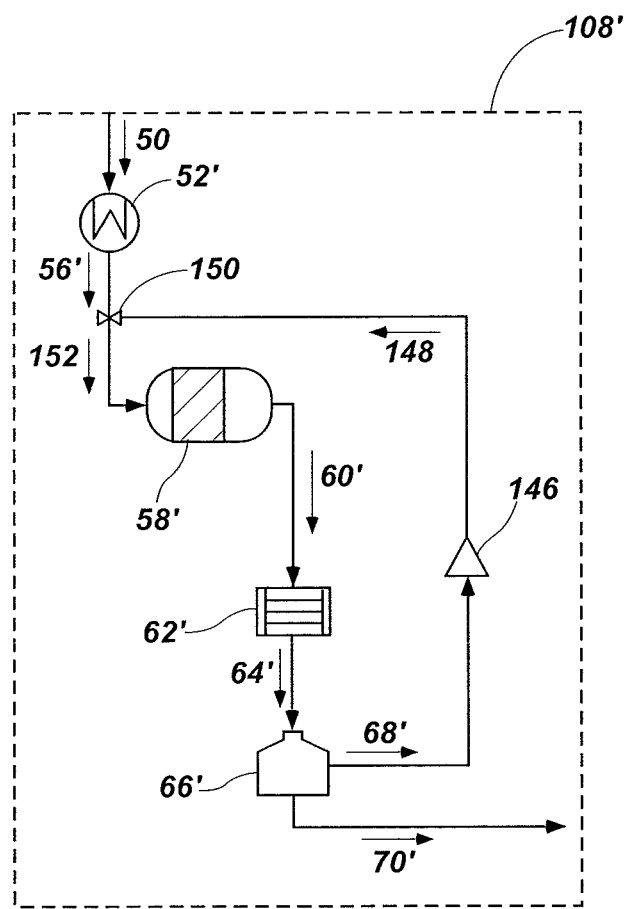
FIG. 6 is a schematic view of an embodiment of a methanol synthesis system portion of the fuel processing system of FIG. 1.

In additional embodiments, the methanol synthesis system 108 may be configured and operated as depicted in FIG. 6. As shown in FIG. 6, the methanol synthesis system 108' may include a gas compressor 146 and a valve, such as a three-way valve 150, which may recycle the offgas 68' back to an inlet of the methanol synthesis reactor 58' for additional methanol synthesis processing. The offgas 68' may be received by the gas compressor 146, which may compress and pressurize the gas. A pressurized offgas 148 may exit the gas compressor 146 and may then be directed to the three-way valve 150 where the gas may be combined with the cooled and treated synthesis gas 56'. A combined synthesis gas 152 may exit the three-way valve 150 and may then be directed into the methanol synthesis reactor 58'.

Figure 7:
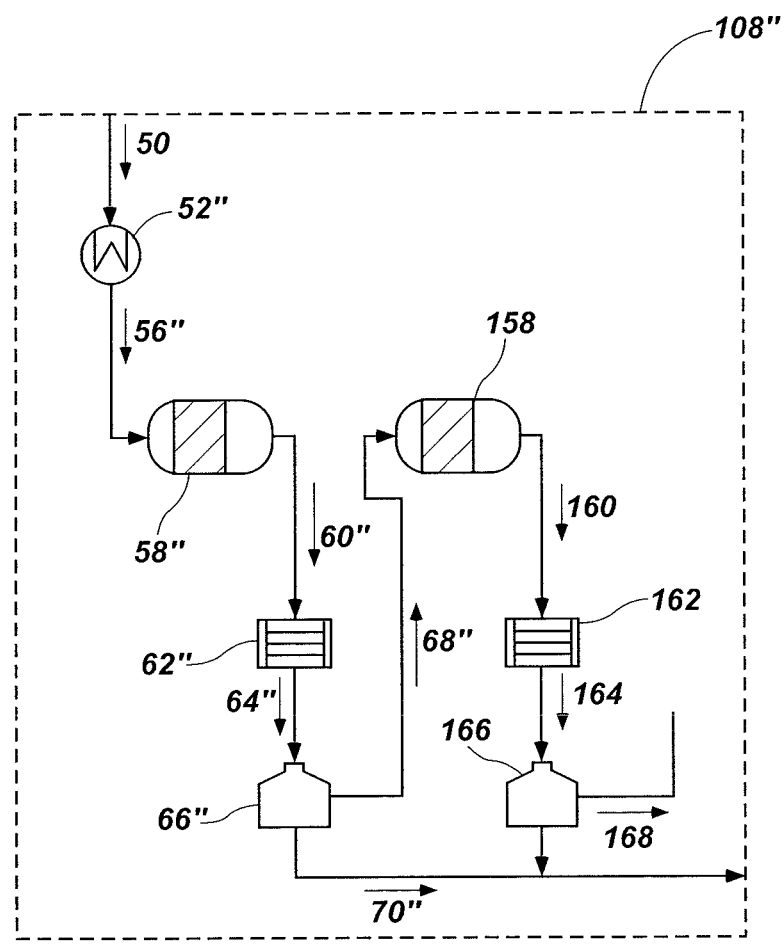
FIG. 7 is a schematic view of an embodiment of a methanol synthesis system portion of the fuel processing system of FIG. 1.

In yet further embodiments, the methanol synthesis system 108 may be configured and operated in a manner as depicted in FIG. 7. As shown in FIG. 7, the methanol synthesis system 108" may include a second methanol synthesis reactor 158, a second condensing unit 162, and a second liquid collection unit 166 to provide additional methanol synthesis processing of the offgas 68". The offgas 68" may be received by the second methanol synthesis reactor 158. In at least some embodiments, a heat exchanger (not shown) may be provided upstream of the second methanol synthesis reactor 158 to bring the offgas 68" to an appropriate temperature. The second methanol synthesis reactor 158 may be any suitable apparatus or device known in the art for producing methanol from the catalyst-assisted reaction of synthesis gas according to equations (5) and (6). The second methanol synthesis reactor 158 may be configured and operated in a manner that is either similar to or different than that of the methanol synthesis reactor 58". The second methanol synthesis reactor 158 may react at least a portion of the unreacted synthesis gas components of the offgas 68" to produce a second crude methanol stream 160. The second crude methanol stream 160 may exit the second methanol synthesis reactor 158 and may then be directed to the second condenser unit 162, which may cool the second crude methanol stream 160 and liquefy any gaseous methanol therein. A second cooled crude methanol stream 164 may then be directed to the second liquid collection unit 166. The second liquid collection unit 166 may collect any liquid components of the second cooled crude methanol stream 164 and may vent any gaseous components as second offgas 168. The liquid components may exit the second liquid collection unit 166 and may be combined with the crude methanol liquid 70". In at least some embodiments, one or more methanol synthesis reactors, condensing units, and liquid separators may be provided downstream of the second collection unit 166 to permit methanol synthesis of any unreacted synthesis gas components remaining in the second offgas 168.

Returning to FIG. 2, the methanol refining system 110 may include a pressure throttle valve 72, a distillation column 76, a condenser 80, a reflux unit 84, and a partial reboiler 94. The crude methanol stream 70 from the methanol synthesis system 108 may be received by the pressure throttle valve 72, which may control the flow of the crude methanol stream 70 to accord with the operational parameters of the distillation column 76. A regulated crude methanol stream 74 may exit the pressure throttle valve 72 and may then be directed into the distillation column 76.

The distillation column 76 may be configured and operated to produce a gaseous tops distillate 78 and a liquid bottoms distillate 92. The gaseous tops distillate 78, which includes methanol, may be directed to a condenser 80 that cools the gaseous top distillate 78 to substantially liquefy any methanol therein. A liquefied methanol stream 82 may exit the condenser 80 and may then be directed into the reflux unit 84. A predetermined portion of the liquefied methanol within reflux drum 84 may be directed back to the distillation column 76 as reflux recycle 88 to assist with the cooling and condensation of upflowing gases in the distillation column 76. Any liquefied methanol within the reflux drum 84 that is not directed back to the distillation column 76 may be directed into the methanol storage and delivery system 112 as a purified methanol liquid 90. The purified methanol liquid 90 may be substantially pure methanol, such as greater than or equal to about 95% methanol. The liquid bottoms distillate 92 may include components having higher boiling points than methanol (e.g., $H_2O$, higher alcohols, carboxylic acids) and may be directed to a partial reboiler 94, which may operate at a temperature that enables some of the lighter (i.e., lower boiling point) components to boil. These components may be directed back into the distillation column 76 as gaseous reboiler recycle 96. The heavier (i.e., higher boiling point) components of the liquid bottoms distillate 92 may be removed as a refined bottoms liquid 98 and may be utilized or disposed of as desired.

Figure 8:
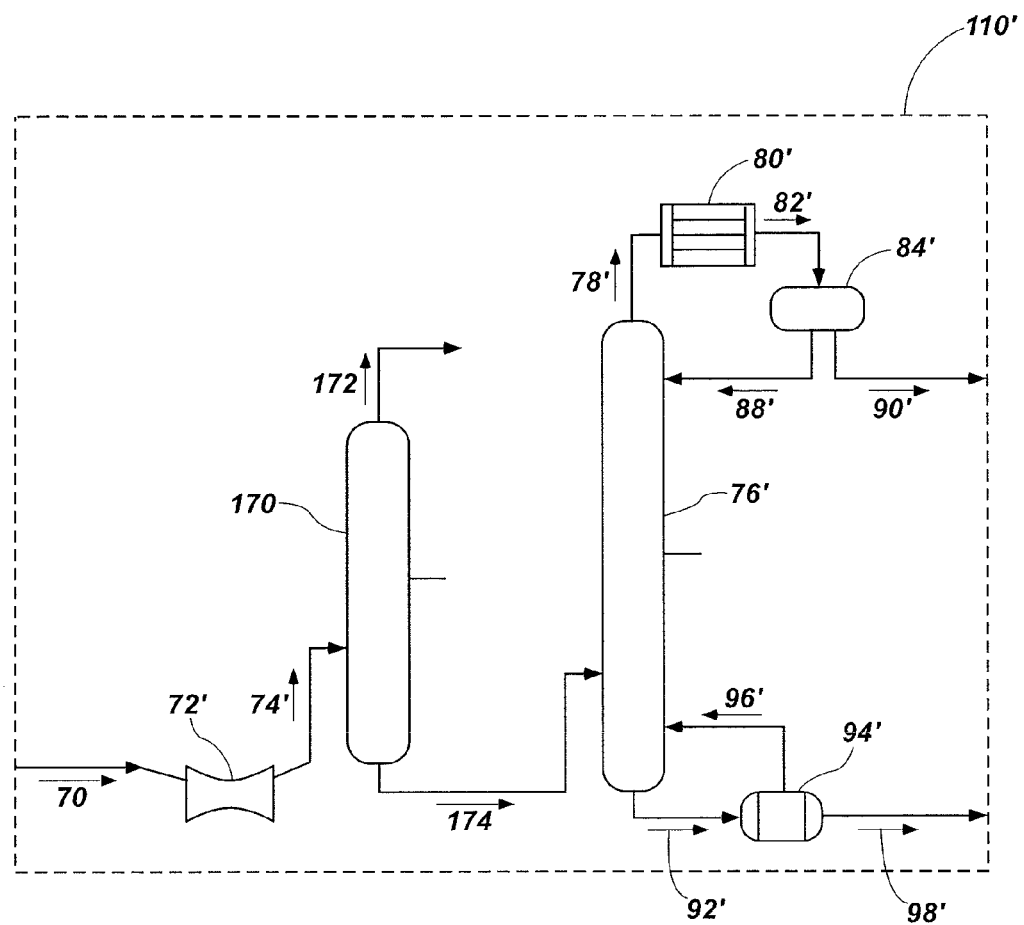
FIG. 8 is a schematic view of an embodiment of a methanol refusing system portion of the fuel processing system of FIG. 1.

In additional embodiments, the methanol refining system 110 may be configured and operated as depicted in FIG. 8. As shown in FIG. 8, the methanol refining system 110' may include a topping distillation column 170. The topping distillation column 170 may produce a gaseous distillate 172 and a liquid distillate 174. The gaseous distillate 172 may include at least some components of the regulated crude methanol stream 74' having a lower boiling point than that of methanol (e.g., ketones, aldehydes, ethers, unreacted synthesis gas). The gaseous distillate 172 may be utilized or disposed of as desired. The liquid distillate 174 may include methanol and at least some components of the regulated crude methanol stream 74' having a higher boiling point than methanol (e.g., higher alcohols, $H_2O$). The liquid distillate 174 may be directed into the distillation column 76' for processing similar to that previously presented in relation to FIG. 2.

In at least some embodiments, such as where the crude methanol liquid 70 exiting the methanol synthesis system 108 is substantially pure methanol (i.e., greater than or equal to about 95% methanol), the methanol refining system 110 may be optional (i.e., the methanol refining system 110 may be omitted), in which case the crude methanol liquid 70 may be directed into the methanol storage and delivery system 112.

Returning to FIG. 2, the methanol storage and delivery system 112 may include a first storage vessel 114, a first flow control valve 116, a second storage vessel 120, a pump 124, a purification unit 128, a third storage vessel 132, a second flow control valve 134, and a dispensing valve 140. The first storage vessel 114 may receive and hold the purified methanol liquid 90 from the methanol refining system 110.

A water supply held within the second storage vessel 120 may be directed to the pump 124 as a water stream 122. The pump 124 may raise the pressure of the water and a pressurized water stream 126 may be directed out of the pump 124 and into the purification unit 128. The purification unit 128 may be any device, apparatus, combination of devices, or combination of apparatuses known in the art for reducing or removing undesired materials (e.g., chemical and biological contaminants) from a water source. By means of non-limiting example, the purification unit 128 may include at least one of a rapid sand filtering system, a granular activated carbon filtering system, a reverse osmosis system, a distillation system, and an ion exchange system. A first purified water stream 130 may exit the purification unit 128 and may then be directed into the third vessel 132, which may hold the purified water. In at least some embodiments, one or more of the second storage vessel 120, the pump 124, the purification unit 128, the third storage vessel 132, and the second control valve 134 may be optional.

A methanol liquid 118 may be directed from the first storage vessel 114 by opening the first flow control valve 116. A second purified water stream 136 may be directed from the purified water storage vessel 132 by opening the second flow control valve 134. The second purified water stream 136 and the methanol liquid 118 may be mixed to form a liquid product 138 including methanol and water that may be dispensed as desired via the dispensing valve 140. However, in at least some embodiments, the liquid product 138 may be substantially free of water. The concentration of methanol in the liquid product 138 may be modified as desired by adjusting the flow of the second purified water stream 136 relative to the flow of the methanol liquid 118 via the first flow control valve 116 and the second flow control valve 134. In at least some embodiments, the liquid product 138 may have a methanol concentration within a range of from about 0.1 M to about 7.0 M, such as from about 0.5 M to about 5.0 M, or from about 1.0 M to about 5.0 M. In additional embodiments, the liquid product 138 may be substantially pure methanol. The liquid product 138 may, for example, be dispensed into one or more empty DMFC cartridges 142 to produce one or more full DMFC cartridges 144 (i.e., cartridges that are ready for use in a DMFC).

In at least some embodiments, the methanol storage and delivery system 112 may be optional (i.e., the methanol storage and delivery system 112 is omitted), in which case the purified methanol liquid 90 exiting the methanol refining system 110 may be utilized as desired. In one or more embodiments, both the methanol refining system 110 and the methanol storage and delivery system 112 may be omitted, in which case the crude methanol liquid exiting the methanol synthesis system 108 may be utilized as desired.

Optionally, a second synthesis gas 192, produced via a biomass gasification system (not shown), may be conventionally delivered into the fuel processing system 100 at a location upstream of the methanol synthesis reactor 58. By means of non-limiting example, as shown in FIG. 2, the second synthesis gas 192 may be combined with the cooled and treated synthesis gas 56 in the methanol synthesis system 108. The biomass gasification system may be any suitable system known in the art for converting a biomass feedstock into a synthesis gas. Suitable systems may be commercially available, such as from Community Power Corporation, Littleton, Colo. and W2E USA Inc., Chicago, Ill. The biomass gasification system may use at least one of logistical fuel and biomass/waste (e.g., wood, paper, food waste, municipal solid waste) as the biomass feedstock. Delivering the second synthesis gas 192 into the fuel processing system 100 may advantageously offset the amount of logistical fuel required to produce the liquid product 138.

Figure 9:
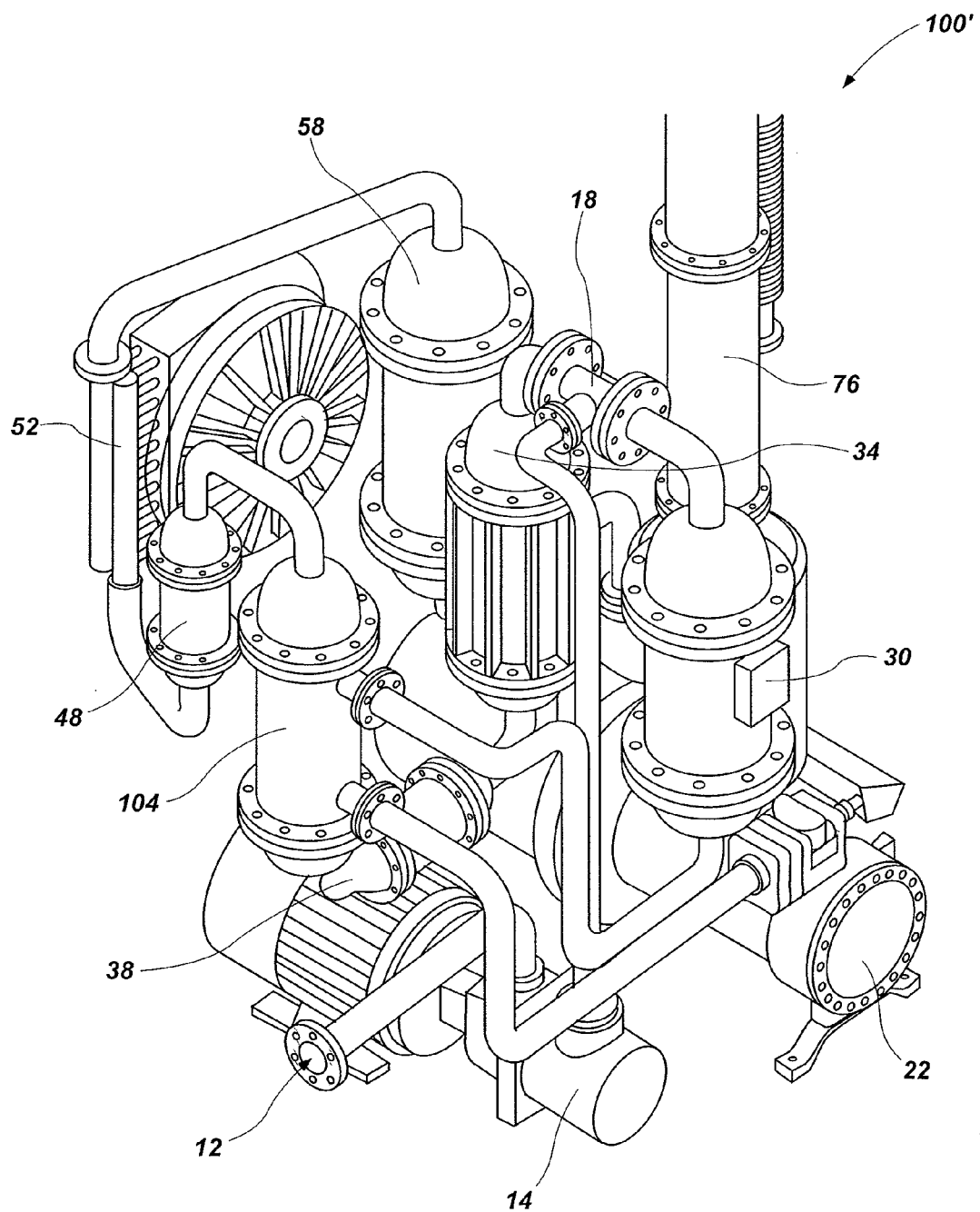
FIGS. 9 and 10 are perspective views of a portion of the fuel processing system of FIG. 2, lacking a methanol storage and delivery system.
Figure 10:
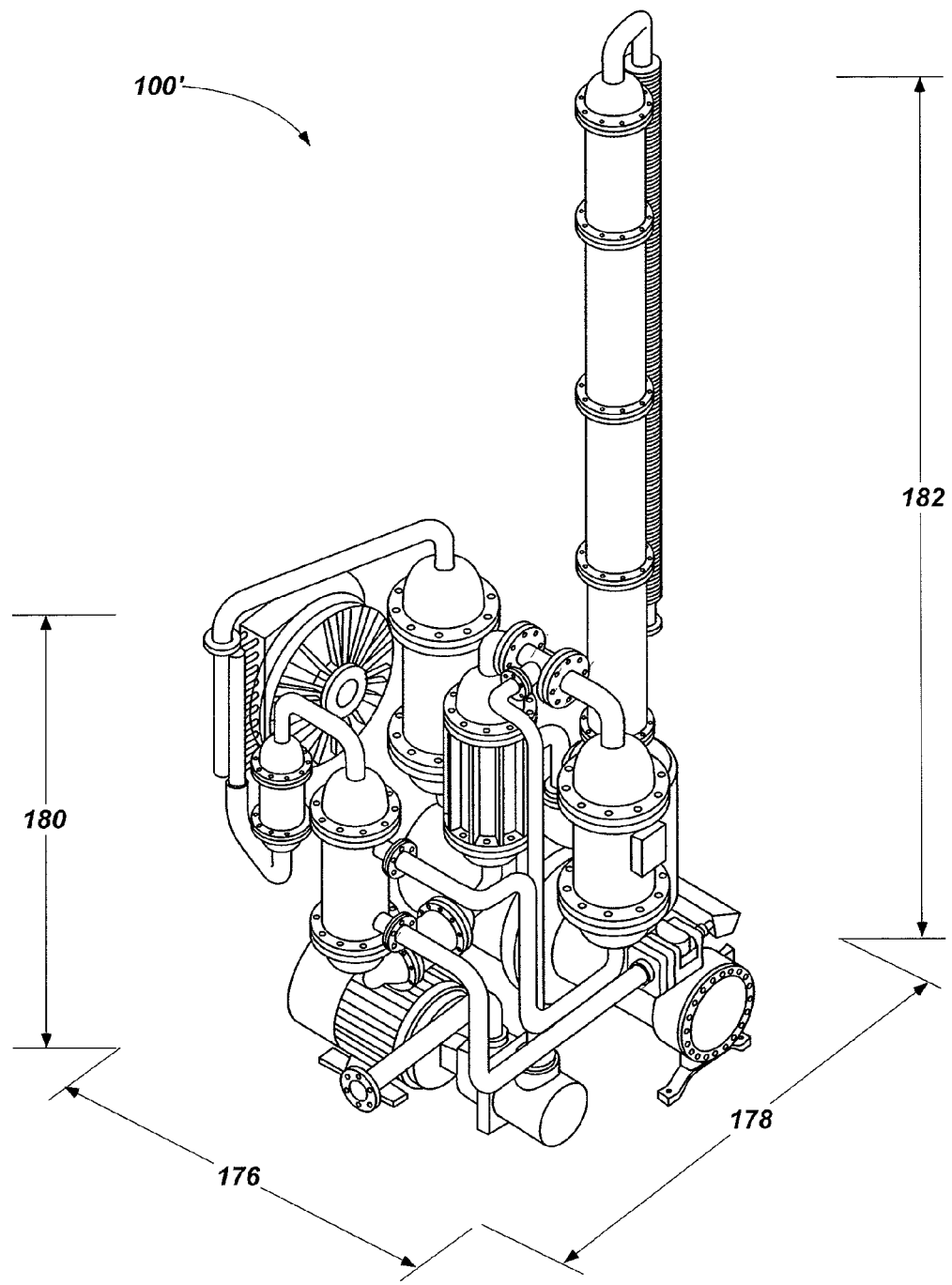

FIGS. 9 and 10 are simplified perspective views of a fuel processing system 100' that is substantially similar to the fuel processing system 100 of FIG. 2, absent some devices or apparatuses, such as the methanol storage and delivery system 112. FIGS. 9 and 10 generally depict how the fuel processing system 100' may be configured for portability. FIG. 9 shows how at least some of the devices or apparatuses of the fuel processing system 100' may be physically positioned therein. FIG. 10 shows at least some of the general physical dimensions of the fuel processing system 100', including a width 176, a length 178, a first height 180, and a second height 182. The width 176 may be within the range of from about 3.5 feet to about 7.5 feet, such as from about 4.5 feet to about 6.5 feet, or from about 5.0 feet to about 6.0 feet. The length 178 may be within the range of from about 6.0 feet to about 10.0 feet, such as from about 7.0 feet to about 9.0 feet, or from 7.5 feet to about 8.5 feet. The first height 180 may be within the range of from about 5.5 feet to about 9.5 feet, such as from about 6.5 feet to about 8.5 feet, or from about 7.0 feet to about 8.0 feet. The second height 182 may be within the range of from about 12.5 feet to about 16.5 feet, such as from about 13.5 feet to about 15.5 feet, or from about 14.0 feet to about 15.0 feet. In one or more embodiments, at least a portion of the fuel processing system 100, 100' may be provided upon a suitable platform (not shown). As used herein, the term "suitable platform" means and includes any material base that is mechanically compatible with the fuel processing system 100, 100' and that enables at least a portion of the fuel processing system 100, 100' to be readily transported, including but not limited to, a structural steel I-beam matrix.

The invention of the present disclosure advantageously permits the efficient, onsite production of methanol. Unlike conventional methanol production systems, the fuel processing system 100, 100' does not rely on traditional fuel sources (e.g., natural gas, coal), and may be smaller in size and scale of methanol production (e.g., about 0.1 metric tons per day, as opposed to a typical commercial scale production of about 1000 metric tons per day, or even a typical pilot scale production of about 175 metric tons per day). As a result, the fuel processing system 100, 100' may be more portable than conventional methanol production systems and, thus, is more adaptable to the logistical limitations (e.g., location and/or policy based restrictions on the transport or delivery of methanol) and technological interests of various specialized operations. By means of non-limiting example, under the "single fuel forward" initiative, the U.S. Military uses JP-8 in its operations and, therefore, currently lacks an infrastructure conducive to the use of methanol-related technologies, such as DMFCs. However, DMFCs are of interest to the U.S. Military as a means of eliminating or reducing the problems associated with conventional batteries. Conventional batteries are unable to support 72 hour missions without recharge/resupply, have relatively long recharge times, suffer from an overabundance of variety, require special electrochemical storage and disposal considerations, and subject the U.S. Military to the additional costs and vulnerabilities of an additional logistics trail. Conversely, DMFCs offer increased energy density, support 72 hour missions without resupply, have relatively short refill times, support a standard power system for multiple devices, do not rely on hazardous electrochemicals (i.e., methanol is a biodegradable chemical with a 17 day half-life), may reduce power system weight, and, when enabled by the present disclosure, do not require an additional logistics trail. The present disclosure will advantageously enable the U.S. Military to benefit from DMFC technology while adhering to a JP-8 logistic framework.

While the present invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the scope of the invention as defined by the following appended claims and their legal equivalents. For example, elements and features disclosed in relation to one embodiment may be combined with elements and features disclosed in relation to other embodiments of the present invention.

What is claimed is:

1. A fuel processing system, comprising:
   a fuel injection system configured to combine ambient air and a logistical fuel to produce a logistical fuel and air mixture;
   a reactor positioned downstream of the fuel injection system and configured to convert the logistical fuel and air mixture to synthesis gas, the reactor selected from the group consisting of a catalytic partial oxidation reactor, a thermal partial oxidation reactor, and an autothermal reactor;
   a recuperative heat exchanger positioned downstream of the reactor and configured to cool the synthesis gas produced by the reactor with the ambient air of the fuel injection system to produce a cooled synthesis gas;
   a water gas shift reactor positioned downstream of the recuperative heat exchanger and configured to treat the cooled synthesis gas to produce additional carbon monoxide; and
   a methanol synthesis system positioned and configured to convert the cooled, treated synthesis gas to a crude methanol liquid.

2. The fuel processing system of claim 1, further comprising a methanol refining system positioned downstream of the methanol synthesis system and configured to process the crude methanol liquid to produce a liquid comprising methanol.

3. The fuel processing system of claim 2, wherein the methanol refining system comprises a single distillation column.

4. The fuel processing system of claim 2, wherein the methanol refining system comprises:
   a first distillation column; and
   a second distillation column located along a flow path of a liquid distillate of the first distillation column.

5. The fuel processing system of claim 1, further comprising a methanol storage and delivery system positioned downstream of the methanol refining system and configured to store the liquid comprising methanol and a water supply comprising a water purification unit and to produce a liquid product comprising methanol.

6. The fuel processing system of claim 1, wherein the reactor comprises a catalytic partial oxidation reactor, and further comprising a desulfurization unit positioned upstream of the catalytic partial oxidation reactor and configured to remove at least a portion of sulfur from the logistical fuel and air mixture.

7. The fuel processing system of claim 6, further comprising another desulfurization unit positioned downstream of the catalytic partial oxidation reactor and upstream of the water gas shift reactor.

8. The fuel processing system of claim 1, wherein the reactor comprises a thermal partial oxidation reactor, and further comprising a desulfurization unit positioned downstream of the recuperative heat exchanger and upstream of the water gas shift reactor and configured to remove at least a portion of sulfur from the cooled synthesis gas.

9. The fuel processing system of claim 1, wherein the methanol synthesis system comprises:
   a heat exchanger configured and positioned to further cool the cooled, treated synthesis gas;
   a methanol synthesis reactor located downstream of the heat exchanger and configured to produce methanol from the further cooled, treated synthesis gas;
   a condensing unit located downstream of the methanol synthesis reactor; and
   a liquid collection unit located downstream of the condensing unit.

10. The fuel processing system of claim 9, wherein the methanol synthesis system further comprises at least one additional methanol synthesis reactor located downstream of the liquid collection unit.

11. The fuel processing system of claim 9, wherein the methanol synthesis reactor comprises a liquid phase catalyst therein.

12. The fuel processing system of claim 9, wherein the methanol synthesis reactor exhibits a single pass conversion efficiency of greater than about 40%.

13. The fuel processing system of claim 9, wherein the methanol synthesis system is configured to receive the cooled, treated synthesis gas produced by the Water gas shift reactor and to receive additional synthesis gas produced by a biomass gasification system.

14. The fuel processing system of claim 1, wherein the fuel injection system comprises a fuel injector configured to produce the logistical fuel and air mixture, the logistical fuel and air mixture comprising droplets of liquid logistical fuel dispersed in air.

15. The fuel processing system of claim 1, wherein the fuel injection system comprises:
   a pump configured to increase the pressure of the logistical fuel to produce pressurized logistical fuel;
   a compressor configured to increase the pressure of the ambient air to produce pressurized air; and
   a fuel injector configured to combine the pressurized logistical fuel and the pressurized air to produce the logistical fuel and air mixture.

16. The fuel processing system of claim 1, wherein the reactor comprises an autothermal reactor, and further comprising a desulfurization unit positioned upstream of the autothermal reactor and configured to remove at least a portion of sulfur from the logistical fuel and air mixture to form a desulfurized logistical fuel and air mixture.

17. The fuel processing system of claim 1, wherein at least one of the fuel injection system, the reactor, the water gas shift reactor, and the methanol synthesis system is located on and attached to a platform configured for transporting the at least one of the fuel injection system, the synthesis gas production system, and the methanol synthesis system.

18. The fuel processing system of claim 1, wherein the fuel processing system is sized and configured to produce between about 1.0 liters per hour of a liquid product comprising methanol and about 50 liters per hour of the liquid product.

19. The fuel processing system of claim 1, further comprising the logistical fuel, the logistical fuel selected from the group consisting of Jet-A, JP-4, and JP-5.

20. The fuel processing system of claim 1, wherein the fuel injection system comprises a fuel injector positioned downstream of the recuperative heat exchanger, the fuel injector configured to combine heated ambient air from the recuperative heat exchanger and the logistical fuel to produce the logistical fuel and air mixture.

21. A method of manufacturing a liquid product comprising methanol, the method comprising:
combining ambient air and a logistical fuel in a fuel injection system to produce a logistical fuel and air mixture;
converting the logistical fuel and air mixture into synthesis gas in a reactor positioned downstream of the fuel injection system, the reactor selected from the group consisting of a catalytic partial oxidation reactor, a thermal partial oxidation reactor, and an autothermal reactor;
cooling the synthesis gas produced by the reactor in a recuperative heat exchanger with the ambient air of the fuel injection system to produce a cooled synthesis gas;
treating the cooled synthesis gas in a water gas shift reactor positioned downstream of the recuperative heat exchanger to produce additional carbon monoxide;
converting the cooled, treated synthesis gas to a crude methanol liquid in a methanol synthesis system;
processing the crude methanol liquid to produce a purified methanol liquid; and
directing at least the purified methanol liquid into a dispensing valve to generate the liquid product comprising methanol and water.

22. The method of claim 21, wherein converting the logistical fuel and air mixture into synthesis gas in a reactor positioned downstream of the fuel injection system comprises:
desulfurizing the logistical fuel and air mixture to produce an at least substantially desulfurized logistical fuel/air mixture; and
reforming the at least substantially desulfurized logistical fuel/air mixture in a catalytic partial oxidation reactor to produce the synthesis gas comprising hydrogen and carbon monoxide.

23. The method of claim 21, further comprising:
desulfurizing the cooled synthesis gas in a desulfurization unit; and
processing the cooled synthesis gas in the water gas shift reactor after desulfurizing the cooled synthesis gas.

24. The method of claim 21, wherein converting the cooled, treated synthesis gas to a crude methanol liquid in a methanol synthesis system comprises:
further cooling the cooled, treated synthesis gas in a heat exchanger;
reacting the further cooled, treated synthesis gas in a methanol synthesis reactor to produce a crude methanol stream;
reducing the temperature of the crude methanol stream to produce a cooled crude methanol stream; and
delivering the cooled crude methanol stream into a liquid collection unit.

25. The method of claim 21, further comprising reacting at least one gaseous component of the cooled crude methanol stream in at least one additional methanol synthesis reactor.

26. The method of claim 21, wherein processing the crude methanol liquid to produce the purified methanol liquid comprises purifying the crude methanol liquid in a single distillation column.

27. The method of claim 21, wherein processing the crude methanol liquid to produce the purified methanol liquid comprises separating at least some components of the crude methanol liquid having a boiling point lower than methanol in a first distillation column and separating at least some components of the crude methanol liquid having a boiling point higher than methanol in a second distillation column.

28. The method of claim 21, wherein directing at least the purified methanol liquid into a dispensing valve to generate the liquid product comprises combining the purified methanol liquid with water at a location upstream of the dispensing valve.

29. The method of claim 28, wherein directing at least the purified methanol liquid into a dispensing valve to generate the liquid product comprising methanol and water comprises producing the liquid product comprising a methanol concentration within a range of from about 0.1 M to about 7.0 M.

* * * * *